R. M. GRUPE.
ELECTRICALLY CONTROLLED LEVER LOCK.
APPLICATION FILED FEB. 20, 1919.
1,346,746.
Patented July 13, 1920.
2 SHEETS—SHEET 1.
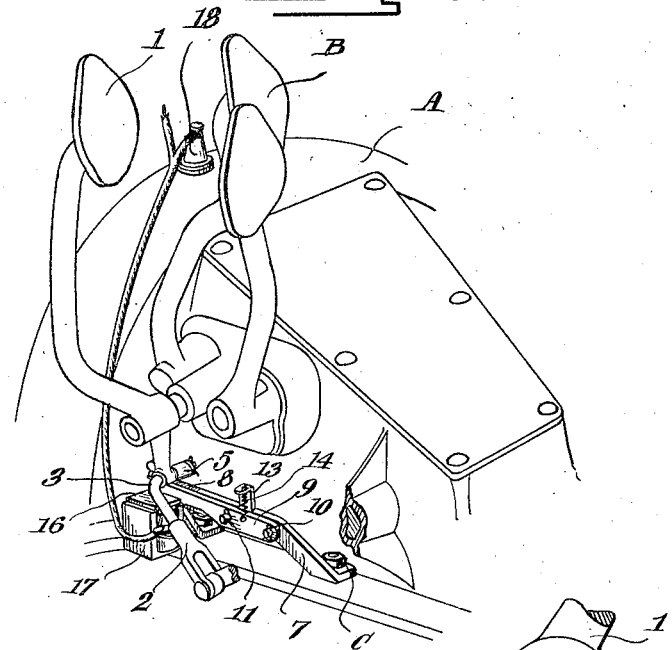
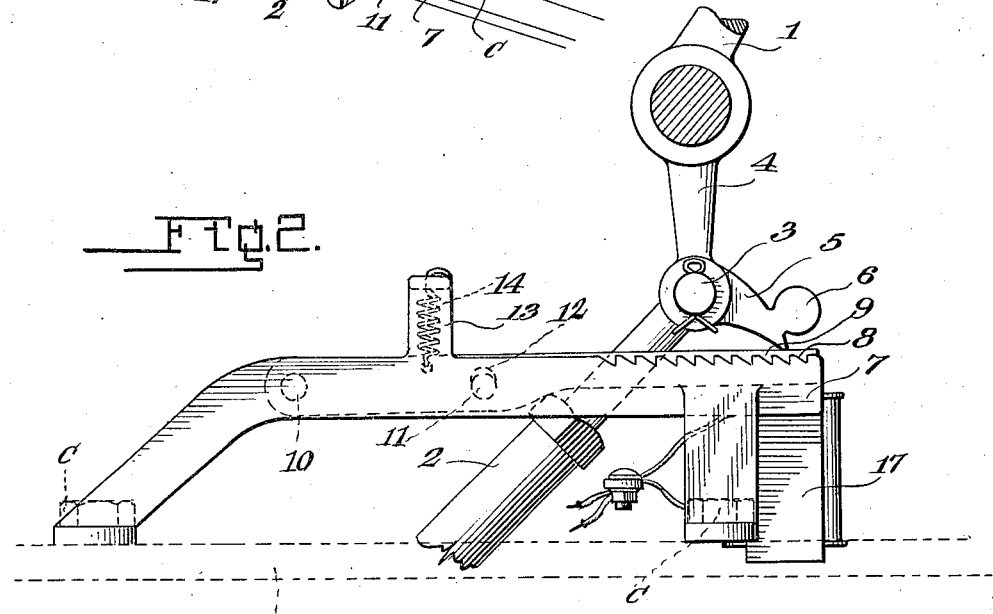
Roy M. Grupe
Inventor
By Lancaster and Allwine
his Attorneys R. M. GRUPE.
ELECTRICALLY CONTROLLED LEVER LOCK.
APPLICATION FILED FEB. 20, 1919.
1,346,746.
Patented July 13, 1920.
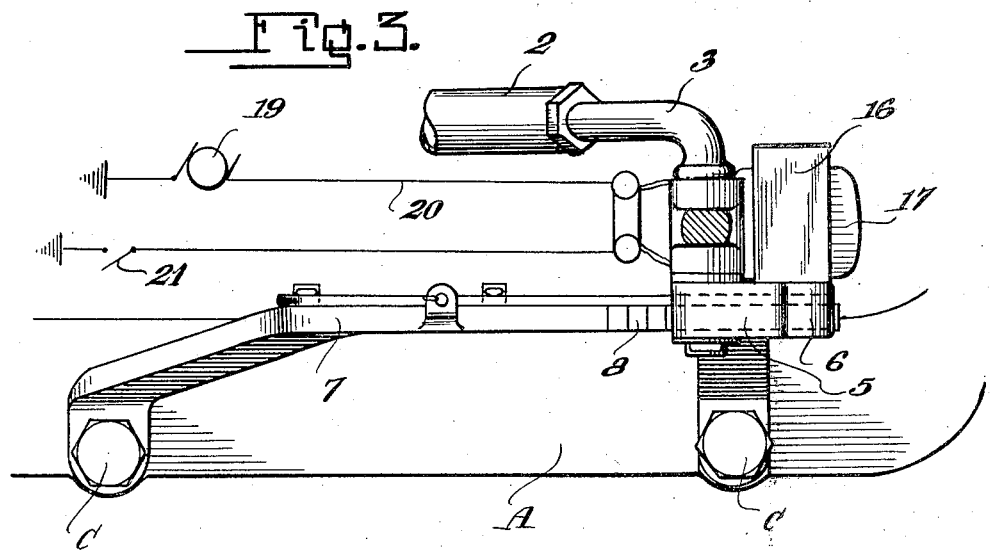
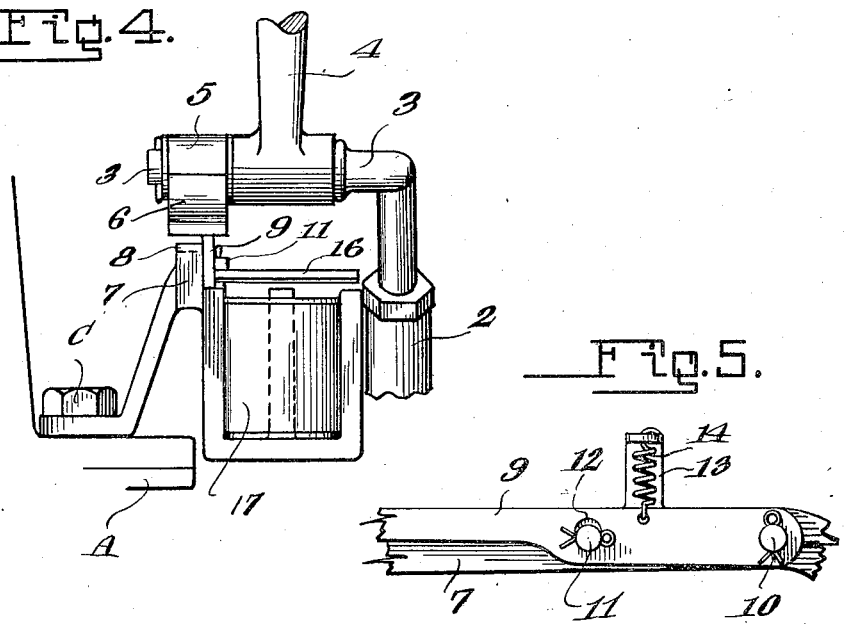
Roy M. Grupe
Inventor

UNITED STATES PATENT OFFICE.

ROY MONROV GRUPE, OF BROADVIEW, MONTANA, ASSIGNOR OF ONE-HALF TO LEO A. HENTER, OF BROADVIEW, MONTANA.

ELECTRICALLY-CONTROLLED LEVER-LOCK.

1,346,746.      Specification of Letters Patent.     Patented July 13, 1920.

Application filed February 20, 1919. Serial No. 278,219.

*To all whom it may concern:*

Be it known that I, ROY M. GRUPE, a citizen of the United States, residing at Broadview, in the county of Yellowstone and State of Montana, have invented certain new and useful Improvements in Electrically-Controlled Lever-Locks, of which the following is a specification.

This invention relates to lever locks, and more particularly to an electrically controlled lock for the low speed lever or pedal of motor vehicles, of the "Ford" type, and an object of the invention is to provide a locking mechanism for maintaining or holding the low speed lever or pedal in operation. It is well known, that in operating "Ford" motor vehicles or others of planetary gear transmission type, it is necessary to hold one foot upon the low speed clutch operating pedal and at times when it is necessary to maintain the low speed for any length of time or distance such as in cities when the traffic is congested or in cases where truck bodies are used upon the chassis of Ford automobiles, this maintaining of pressure upon the pedal becomes tiresome.

More specifically, the invention comprehends the provision of a rack which is attached to the casing of the motor or engine of the motor vehicle and which has associated therewith a weighted pawl carried by the pedal or lever for low speed control of the vehicle and also to provide a spring actuated lever which is pivotally carried by the rack structure and normally supports the pawl in a raised unlocking position, which lever carries an armature adapted to be attracted upon the energizing of an electric magnet, to operate the said lever for allowing the pawl to engage one of the teeth of the rack or ratchet structure to lock the said lever or pedal in its adjusted position and also to provide means whereby the pawl will be disengaged or unlocked from engagement with the rack upon slight forward movement of the lever or pedal.

Other objects of the invention will appear in the following detailed description taken in connection with the accompanying drawings forming a part of this specification and in which drawings:

Figure 1 is a perspective view of a fragment of a motor vehicle engine showing the improved lock applied thereto.

Fig. 2 is a side elevation of the lock.

Fig. 3 is a top plan of the lock applied.

Fig. 4 is an end view of the lock, and

Fig. 5 is a fragmentary side elevation of the lock.

Referring more particularly to the drawings, A indicates a fragment of the casing of an ordinary motor vehicle engine or motor with which is associated the various pedals indicated at B for controlling the speed and operation of the vehicle.

The pedal 1 which is the low speed pedal has a usual slow speed connection 2 connected thereto below its pivot and the pin 3 of this low speed connection 2 is elongated so as to project upon the opposite side of the pedal lever carried arm 4 from the connection 2. This elongated end of the pin 3 has a pawl 5 pivoted thereon. A weight 6 is formed upon the pawl 5 near its outer free edge, to force the pawl downwardly at all times.

A ratchet bar 7 is attached to the casing A by the bolts C which form a part of the casing. The bar 7 has a plurality of ratchet teeth 8 formed upon its upper edge at one end, which are adapted to be engaged by the nib of the pawl 5 to lock the lever or pedal 1 in adjusted position. However the pawl 5 is normally held out of engagement with any one of the teeth 8 by a lever 9. The lever 9 is pivotally mounted at one end, upon a pin 10 which is carried by the bar 7 and a pin 11 is also carried by the bar and engages in an elongated opening 12 formed in the lever 9 intermediate its ends for guiding and limiting the pivotal movement of the lever. An upstanding bracket 13 is formed upon the bar 7 and a spring 14 is connected to this bracket and to the lever 9, for holding the upper edge of the lever 9 above the upper edge of the bar 7 as shown in Fig. 4 of the drawings and also in Fig. 2 of the drawings. The biting edge of the pawl 5 engages and rides over this upper edge of the lever 9, holding the pawl out of engagement with the ratchet teeth 8, and consequently permitting unimpeded movement of the lever or pedal 1.

The lever 9 has an armature 16 formed thereon and projecting laterally from its free end which armature is adapted to be attracted upon the energizing of an ordinary electric magnet 17 to rock the lever 9 and move it downwardly to allow the pawl 5 to engage one of the ratchet teeth 8 for locking the lever or pedal 1 against movement. The magnet structure 17 has connection with the magneto contact 18 of the engine construction and to the frame of the engine or ground of the ordinary magneto circuit as shown in diagram in Fig. 3 of the drawings, the magneto being indicated by the numeral 19 and it having connection through a wire 20 with one pole of the magnet 17 while the other pole is connected to the vehicle structure or ground in any suitable manner, embodying a circuit maker 21 near the said connection, by means of which the energizing of the magnet 17 may be controlled. The circuit maker 21 may be an ordinary push button switch of any desired type and it is preferably to be placed upon the steering post of the vehicle or in any place where it can be conveniently reached by the driver of the vehicle.

In operation, when it is desired to maintain the speed transmission mechanism in a low speed position for any length of time, the circuit maker 21 is closed, which will permit the energizing of the magnet 17. The energizing of the magnet 17 will attract the armature 16, moving the free end of the lever 9 downwardly and consequently moving the upper edge of the lever 9 below the upper edge of the ratchet teeth 8, carried by the bar 7 allowing the pawl 5 to engage any one of the ratchet teeth 8, and lock or hold the lever or pedal 1 in its adjusted position. After the lever 9 has been lowered, by energizing of the magnet 17 the circuit maker 21 may be operated to break the circuit through the magnet, and the binding engagement of the nib or point of the pawl 5 with one of the teeth 8 together with the weight of the pawl and its weighted portion 6 will retain the pawl in connection with the ratchet teeth, and hold the lever in its locked position. When it is desired to release the lever for adjustment of the speed changing mechanism of the vehicle, a slight pressure is applied to the lever which causes the pawl to ride over one of the teeth and out of engagement with the tooth against which it has previously been binding. Upon the movement of the pawl out of binding engagement with the tooth, the spring 14 will act to raise the lever 9, moving the pawl upwardly above the ratchet teeth 8 and consequently preventing inner engagement between the pawl and ratchet teeth, holding the pedal or lever 1 for free unimpeded movement until the circuit maker is again closed.

Changes in details may be made without departing from the spirit of this invention, but;

I claim:

1. The combination with a clutch operating lever, of means for locking the lever against movement, means normally maintaining said locking means in an unlocking position, and electrically operated means for operating said last-named means to permit movement of said locking means into a locking position.

2. The combination with a lever, of a rack, means carried by said lever for engagement with said rack to lock the lever against movement, means normally maintaining said rack engaging means out of a rack engaging position, and electrically operated means for moving said last named means into position to permit engagement of the rack engaging means with the rack.

3. The combination with a speed clutch operating lever of motor vehicles, of means for locking the lever in adjusted positions, means normally maintaining said locking means in an unlocked position, and electrically operated means for controlling the operation of said last-named means.

4. The combination with the speed clutch operating lever of a motor vehicle, of a pawl pivotally connected to the lever, a rack having teeth adapted to be engaged by said pawl to lock the lever in adjusted position, means normally maintaining said pawl out of engagement with said rack teeth, and electrically operated means for operating said last named means to permit engagement of the pawl and rack teeth.

5. The combination with the speed clutch operating lever of a motor vehicle, of a stationary rack, a pawl pivotally connected to the lever, a weight upon the free end of said pawl and normally urging the pawl into engagement with the rack teeth, means engaging said pawl and normally holding it out of engagement with said rack, and electrically operated means adapted to operate said last named means to permit engagement of the pawl and rack.

6. The combination with the speed clutch operating lever of a motor vehicle, of a stationary rack, a pawl pivotally connected to the lever, a weight upon the free end of said pawl and normally urging the pawl into engagement with the rack teeth, means engaging said pawl and normally holding it out of engagement with said rack, and electrically operated means adapted to operate said last named means to permit engagement of the pawl and rack, and means to move said pawl restraining means into position to hold the pawl out of engagement with the rack after disconnection of the pawl with any one of the teeth of the rack.

7. The combination with the speed clutch operating lever of a motor vehicle, of a stationary rack, a pawl pivotally connected to said lever and adapted for engagement with one of the rack teeth to lock the lever in adjusted position, a lever pivotally connected to said rack, means normally maintaining the upper edge of the said lever above the upper edge of the rack and in engagement with said pawl to hold the pawl out of engagement with the rack and electrical means for moving said lever downwardly to permit engagement of the pawl with said rack.

8. The combination with the speed clutch operating lever of a pawl pivotally connected to the lever, a rack, a weight upon the free end of said pawl and normally urging the pawl into engagement with the teeth of said rack, a lever pivotally carried by the rack, means carried by said rack and connected to said lever for urging the free end of the lever upwardly for maintaining said pawl out of engagement with said rack, an armature carried by the free end of said lever, an electric magnet, said electric magnet adapted to attract said armature upon energizing of the magnet to move said lever downwardly to permit said pawl to fall into engagement with one of the teeth of said rack.

9. The combination with a lever, of a rack bar arranged below the lever, a pawl pivotally connected to said lever and arranged to normally engage said rack bar, a second lever pivotally connected to the rack bar, spring means connecting the rack bar and the second mentioned lever for normally holding the second mentioned lever above the upper surface of said rack bar for holding the pawl out of engagement with the rack bar, and means for operating said second mentioned lever to bring the same below the upper edge of the rack bar against the tension of said spring means to permit the pawl to engage the rack.

ROY MONROV GRUPE.